(12) United States Patent
Wang

(10) Patent No.: US 12,476,450 B2
(45) Date of Patent: Nov. 18, 2025

(54) CABLE ASSEMBLY AND MANUFACTURING METHOD THEREFOR

(71) Applicant: Changchun Jetty Automotive Technology Co., Ltd., Changchun (CN)

(72) Inventor: Chao Wang, Changchun (CN)

(73) Assignee: CHANGCHUN JETTY AUTOMOTIVE TECHNOLOGY CO., LTD., Jilin (CN)

( * ) Notice: Subject to any disclaimer, the term of this patent is extended or adjusted under 35 U.S.C. 154(b) by 140 days.

(21) Appl. No.: 18/281,420

(22) PCT Filed: Nov. 9, 2021

(86) PCT No.: PCT/CN2021/129457
§ 371 (c)(1),
(2) Date: Sep. 11, 2023

(87) PCT Pub. No.: WO2022/188449
PCT Pub. Date: Sep. 15, 2022

(65) Prior Publication Data
US 2024/0170940 A1    May 23, 2024

(30) Foreign Application Priority Data
Mar. 12, 2021  (CN) .......................... 202110269926.0

(51) Int. Cl.
*H02G 15/08* (2006.01)
*H02G 1/14* (2006.01)

(52) U.S. Cl.
CPC ............... *H02G 15/08* (2013.01); *H02G 1/14* (2013.01)

(58) Field of Classification Search
CPC .......... H02G 1/14; H02G 15/08; H02G 15/18; H01R 4/02; H01R 4/10; H01R 4/18;
(Continued)

(56) References Cited

U.S. PATENT DOCUMENTS 3,859,455 A * 1/1975 Gommans ............ H01R 9/0503
                                                                    174/92
3,872,237 A * 3/1975 Eyre .................... H02G 15/085
                                                                    174/92
(Continued)

FOREIGN PATENT DOCUMENTS

CN         1574111 A       2/2005
CN       102386605 A       3/2012
(Continued)

OTHER PUBLICATIONS

Second Office Action issued for corresponding Chinese Patent Application No. 202110269926.0 mailed on Nov. 13, 2024, 17 pages.
(Continued)

*Primary Examiner* — William H. Mayo, III
(74) *Attorney, Agent, or Firm* — LOZA & LOZA, LLP; Michael Fedrick

(57) ABSTRACT

A cable assembly and a manufacturing method for a cable assembly. The cable assembly includes a first cable and a second cable. The first cable includes a first cable core and a first shielding layer. A periphery of the first cable core is wrapped by a first protective layer, and the first shielding layer is disposed on an outer side of the first protective layer. The second cable includes a second cable core and a second shielding layer. A periphery of the second cable core is wrapped by a second protective layer, and the second shielding layer is disposed on an outer side of the second protective layer. The first shielding layer is electrically connected to the second shielding layer.

22 Claims, 5 Drawing Sheets

(58) Field of Classification Search
CPC .......... H01R 4/183; H01R 4/186; H01R 4/20; H01R 4/62; H01R 4/70; H01R 9/0518; H01R 9/07; H01R 43/048; H01B 7/0045; H01B 7/18; H01B 7/28; H01B 7/282
USPC .............. 174/74 R–88 R; 439/578–585, 638, 439/650–655, 675, 877
See application file for complete search history.

(56) References Cited

U.S. PATENT DOCUMENTS

| | | | | |
|---|---|---|---|---|
| 11,316,287 | B2* | 4/2022 | Tohyama | H01R 4/20 |
| 2002/0040803 | A1* | 4/2002 | Buyst | H02G 15/105 |
| | | | | 174/88 R |
| 2018/0233893 | A1* | 8/2018 | Adachi | H01B 7/18 |

FOREIGN PATENT DOCUMENTS

| | | | |
|---|---|---|---|
| CN | 102386605 | B | 3/2012 |
| CN | 107221824 | A | 9/2017 |
| CN | 108429022 | A | 8/2018 |
| CN | 112292791 | A | 1/2021 |
| CN | 112967838 | A | 6/2021 |
| CN | 215118370 | U | 12/2021 |
| FR | 2551927 | A1 | 3/1985 |
| JP | H0613323 | U | 2/1994 |
| JP | 2018133837 | A | 8/2018 |
| JP | 2018137134 | A | 8/2018 |
| JP | 2020115413 | A | 7/2020 |

OTHER PUBLICATIONS

International Search Report for corresponding International Patent Application No. PCT/CN2021/129457, dated Jan. 25, 2022.
First Office Action and Search Report issued on Jun. 12, 2024 for counterpart Chinese Patent Application No. 202110269926.0, dated Jun. 12, 2024, 17 pages.
Extended European Search Report issued on Jul. 23, 2024 for counterpart European Patent Application No. 21929912.0, 10 pages.
Search Report issued Jun. 12, 2024 for Chinese Patent Application No. 2021102699260, 4 pages.
Decision of Rejection issued on Mar. 26, 2025 for counterpart Chinese Patent Application No. 202110269926.0.
First Office Action issued on Apr. 4, 2025 for counterpart European Patent Application No. 21929912.0.
Notice for grant issued for corresponding Japanese Patent Application No. 2023-554865 mailed on Jun. 3, 2025.

* cited by examiner

CABLE ASSEMBLY AND MANUFACTURING METHOD THEREFOR

CROSS-REFERENCE TO RELATED APPLICATIONS

The present disclosure is a U.S. national stage of International Patent Application No. PCT/CN2021/129457, filed on Nov. 9, 2021, which claims the benefit of priority under 35 U.S.C. § 119 to Chinese Patent Application No. 202110269926.0, filed on Mar. 12, 2021, which are hereby incorporated by reference in their entireties

TECHNICAL FIELD

The present disclosure relates to the technical field of cables, and particularly to a cable assembly and a manufacturing method therefore.

BACKGROUND

With the continuous development and widespread application of the new energy technologies, more and more vehicles are using batteries as power sources. In a vehicle equipped with a battery, electric devices such as a motor and an on-board computer need to be connected to the battery through a cable, so that the electric energy in the battery can be transmitted to the electric devices through the cable to enable, the electric devices to play their respective functions. In practical applications, the cable used to connect the battery and the electrical devices is not a complete cable, but composed of a plurality of cables which are connected in sequence.

Specifically, the cable generally includes a cable core and a shielding net wrapped around an outer side of the cable core. The main function of the cable core is to transmit power. The main function of the shielding net is to provide a good shielding effect on the cable core, so as to prevent a current magnetic field of the cable core from generating electromagnetic interference on external electrical components.

At present, the shielding connection structure used to butt two cables is immature, resulting in failure to form a stable and effective connection between the shielding nets of the two cables at the butting position, which is not conducive to ensuring the electromagnetic shielding effect between the cable cores.

SUMMARY

The present disclosure provides a cable assembly and a manufacturing method for a cable assembly, which are capable of effectively improving the electromagnetic shielding effect between cables.

It is one aspect of the present disclosure to provide a cable assembly, including a first cable and a second cable. The first cable includes a first cable core and a first shielding layer. A periphery of the first cable core is wrapped by a first protective layer, and the first shielding layer is disposed on an outer side of the first protective layer. The second cable includes a second cable core and a second shielding layer. A periphery of the second cable core is wrapped by a second protective layer, and the second shielding layer is disposed on an outer side of the second protective layer. A free end of the first cable core is connected to a free end of the second cable core, so as to realize an electrical connection between the first cable core and the second cable core. A free end of the first shielding layer is connected to a free end of the second shielding layer, so as to realize an electrical connection between the shielding layers of the first cable and the second cable, thereby ensuring the continuity of the electromagnetic shielding structure of the cable assembly, and effectively improving the electromagnetic shielding effect of the cable assembly.

A connection position between the first shielding layer and the second shielding layer is in a symmetrical connection arrangement.

If the connection position between the first shielding layer and the second shielding layer is a single spot, a large current will flow through the connection position to generate a magnetic field, which will be coupled with a magnetic field generated by the cable core, thereby causing a large radiation at the whole cable connection position, and seriously affecting the working condition of other electrical appliances. When the connection positions between the first shielding layer and the second shielding layer are symmetrical, the magnetic fields generated at the connection positions are in opposite directions and will offset each other to reduce the resultant magnetic field, thereby decreasing the radiation at the cable connection position, effectively reducing the magnetic field generated by the cable core and weakening the affection on other electrical appliances.

A connection position between the first shielding layer and the second shielding layer is in a 360° connection arrangement.

Compared with the symmetrical connection arrangement of the connection position between the first shielding layer and the second shielding layer, the 360° connection arrangement of the connection position between the first shielding layer and the second shielding layer can greatly shield and offset the radiation generated by the cable core and the radiation generated by the shielding layer itself, thereby achieving an optimal shielding effect at the cable connection position.

The free end of the first shielding layer may be lapped or butted with the free end of the second shielding layer, so as to improve the connection convenience.

In addition, in order to improve the connection strength between the first shielding layer and the second shielding layer, the first shielding layer and the second shielding layer may also be fixedly connected by welding.

The cable assembly further includes a conductive device disposed at a part of the periphery of the first cable core and a part of the periphery of the second cable core. A first end of the conductive device is connected to the free end of the first shielding layer, and a second end of the conductive device is connected to the free end of the second shielding layer. When a connection length between the first shielding layer and the second shielding layer is insufficient, the conductive device may be used fix transitional connection, and also can ensure the shielding effect at the connection position.

As an example, a connection position between the first end of the conductive device and the free end of the first shielding layer is in a symmetrical connection arrangement, and a connection position between the second end of the conductive device and the free end of the second shielding layer is in a symmetrical connection arrangement.

If the connection position between the conductive device and the shielding layer is a single spot, a large current will flow through the connection position to generate a magnetic field, which will be coupled with a magnetic field generated by the cable core, thereby causing a large radiation at the whole cable connection position, and seriously affecting the working condition of other electrical appliances. When the connection positions between the conductive device and the shielding layer are symmetrical, the magnetic fields generated at the connection positions are in opposite directions and will offset each other to reduce the resultant magnetic field, thereby decreasing the radiation at the cable connection position, effectively reducing the magnetic field generated by the cable core and weakening the affection on other electrical appliances.

As an example, a connection position between the first end of the conductive device and the free end of the first shielding layer is in a 360° connection arrangement, and a connection position between the second end of the conductive device and the free end of the second shielding layer is in a 360° connection arrangement.

Compared with the symmetrical connection arrangement of the connection position between the conductive device and the shielding layer, the 360° connection arrangement of the connection position between the conductive device and the shielding layer can greatly shield and offset the radiation generated by the cable core and the radiation generated by the shielding layer itself, thereby achieving an optimal shielding effect at the cable connection position.

When the free end of the first shielding layer and the free end of the second shielding layer are connected by the conductive device, the conductive device may be lapped or butted with the first shielding layer. Correspondingly, the conductive device may be lapped or butted with the second shielding layer, thereby improving the connection effect between the first shielding layer and the conductive device and between the second shielding layer and the conductive device.

In addition, in order to improve the connection strength between the conductive device and the first shielding layer, the conductive device and the first shielding layer may also be fixedly connected by welding. Correspondingly, in order to improve the connection strength between the conductive device and the second shielding layer, the conductive device and the second shielding layer may also be fixedly connected by welding.

As an example, an insulation protective layer may be disposed at peripheries of the first shielding layer, the second shielding layer and the conductive device, so as to improve the insulation reliability of the cable assembly and prevent the first shielding layer, the second shielding layer and the conductive device from being in conductive contact with an external conductor.

As an example, the first cable core has a protruding segment protruding out of the first protective layer, and the second cable core has a protruding segment protruding out of the second protective layer, so as to facilitate the electrical connection between the first cable core and the second cable core.

As an example, in order to provide a good insulation protection for a connection position between the first cable core and the second cable core, an isolation sleeve is further disposed on an outer side of a connection position between the first cable core and the second cable core. The isolation sleeve may be disposed at peripheries of the protruding segments of the first cable core and the second cable core.

As an example, a thickness of the isolation sleeve is greater than at least one selected from the group consisting of a thickness of the first protective layer and a thickness of the second protective layer.

As an example, one end of the isolation sleeve may be butted with the first protective layer, and the other end of the isolation sleeve may be butted with the second protective layer, so as to provide a sealed protection for the first cable core and the second cable core.

As an example, the free end of the first cable core and the free end of the second cable core may be connected by butting or lapping.

For example, an end face of the free end of the first cable core is butted with an end face of the free end of the second cable core. During implementations, in order to ensure a stable connection between the first cable core and the second cable core, the end face of the free end of the first cable core and the end face of the free end of the second cable core may be connected by welding such as laser welding, ultrasonic welding, resistance welding, pressure diffusion welding, or soldering, etc., and the specific welding process is not limited in the present disclosure.

In addition, the free end of the first cable core and the free end of the second cable core may have overlapping areas to achieve lapping. During implementations, in order to ensure a stable connection between the first cable core and the second cable core, the free end of the first cable core and the free end of the second cable core (i.e., the overlapping areas of the first cable core and the second cable core) may be connected by welding such as laser welding, ultrasonic welding, resistance welding, pressure diffusion welding, or soldering, etc., and the specific welding process is not limited in the present disclosure.

As an example, a minimum cross-sectional area of a lapped or butted position between the first cable core and the second cable core may be greater than or equal to a smallest one of a cross-sectional area of the first cable core and a cross-sectional area of the second cable core, so as to avoid the cable resistance from being too large due to the small cross-sectional area of the lapped or butted position between the first cable core and the second cable core, thereby preventing the temperature rise value from exceeding the standard requirement when the current is applied.

As an example, thicknesses of the first shielding layer, the second shielding layer and the conductive device are 0.003 mm to 27 mm.

As an example, a minimum cross-sectional area of a lapped or butted position between the free end of the first shielding layer and the free end of the second shielding layer is 60% to 260% of a smallest one of a cross-sectional area of the first shielding layer and a crosssectional area of the second shielding layer, thereby ensuring the connection effect between the free end of the first shielding layer and the free end of the second shielding layer.

As an example, a minimum cross-sectional area of a lapped or butted position between the conductive device and the first shielding layer or the second shielding layer is 60% to 260% of a smallest one of a cross-sectional area of the first shielding layer and a cross-sectional area of the second shielding layer, thereby ensuring the connection effect between the conductive device and the first shielding layer or the second shielding layer.

As an example, an impedance of the connection position between the first shielding layer and the second shielding layer is less than 13.7 mΩ.

As an exemplary example, an impedance of the connection position between the first shielding layer and the second shielding layer is less than 12.5 mΩ.

As an example, an impedance of the connection position between the first end of the conductive device and the free end of the first shielding layer is less than 13.7 mΩ, and an impedance of the connection position between the second end of the conductive device and the free end of the second shielding layer is less than 13.7 mΩ.

As an exemplary example, an impedance of the connection position between the first end of the conductive device and the free end of the first shielding layer is less than 12.5 mΩ, and an impedance of the connection position between the second end of the conductive device and the free end of the second shielding layer is less than 12.5 mΩ.

The impedance of the connection position between the first shielding layer and the second shielding layer and the impedance of the connection position between the conductive device and the shielding layer should be as small as possible, so that current generated by the shielding layer can flow back to an energy source or a grounded position without hindrance. If the impedance of the connection position between the first shielding layer and the second shielding layer and the impedance of the connection position between the conductive device and the shielding layer are large, huge current will be generated at the above connection positions, thereby causing a large radiation at the cable connection position.

As an example, the first cable further includes a third protective layer, and the second cable further includes a fourth protective layer The third protective layer is disposed on an outer side of the first shielding layer, and the fourth protective layer is disposed on an outer side of the second shielding layer. The use safety and the structural strength of the first cable can be effectively improved by the third protective layer. Correspondingly, the use safety and the structural strength of the second cable can be effectively improved by the fourth protective layer.

It is another aspect of the present disclosure to provide a manufacturing method for a cable assembly, including:
  providing a first cable, which comprises a first cable core, a first protective layer and a first shielding layer, the first protective layer is disposed on an outer side of the first cable core, and the first shielding layer is disposed on an outer side of the first protective layer;
  peeling off the first shielding layer and the first protective layer at a first end of the first cable to expose the first cable core;
  providing a second cable, which comprises a second cable core, a second protective layer and a second shielding layer, the second protective layer is disposed on an outer side of the second cable core, and the second shielding layer is disposed on an outer side of the second protective layer;
  peeling off the second shielding layer and the second protective layer at a first end of the second cable to expose the second cable core;
  connecting a free end of the first cable core and a free end of the second cable core; and
  connecting a free end of the first shielding layer and a free end of the second shielding layer.

As an example, the step of connecting the free end of the first cable core and the free end of the second cable core specifically includes:
  connecting the free end of the first cable core and the free end of the second cable core by welding or crimping.

As an example, the step of connecting the free end of the first shielding layer and the free end of the second shielding layer specifically includes:
  connecting the free end of the first shielding layer and the free end of the second shielding layer by welding.

As an example, the step of connecting the free end of the first shielding layer and the free end of the second shielding layer specifically includes:
  providing and disposing a conductive device at a part of a periphery of the first cable core and a part of a periphery of the second cable core, connecting a first end of the conductive device to a free end of the first shielding layer, and connecting a second end of the conductive device to a free end of the second shielding layer.

As an example, before the step of connecting the first end of the conductive device to the free end of the first shielding layer, and connecting the second end of the conductive device to the free end of the second shielding layer, the method further includes:
  disposing an isolation sleeve at a periphery of a connection position between the first cable core and the second cable core.

The embodiments of the present disclosure achieve the following advantageous effects:

In the cable assembly provided by the present disclosure, the first shielding layer and the second shielding layer may be connected directly or through the conductive device, thereby achieving high flexibility and convenience, and in addition, effectively ensuring the continuity of the electromagnetic shielding between the first shielding layer and the second shielding layer.

REFERENCE NUMERALS

10—first cable; 11—first cable core; 12—first protective layer; 13—first shielding layer; 14—third protective layer; 20—second cable; 21—second cable core; 22—second protective layer; 23—second shielding layer; 24—fourth protective layer; 30—isolation sleeve; 31—conductive device; 32—insulation protective layer.

DETAILED DESCRIPTION

For a better understanding of the technical features of the present disclosure by those skilled in the art, a detailed description of the embodiments of the present disclosure will be set forth with reference to the drawings.

Embodiment 1

The embodiment provides a solution of directly connecting shielding nets of cables.

Figure 1:
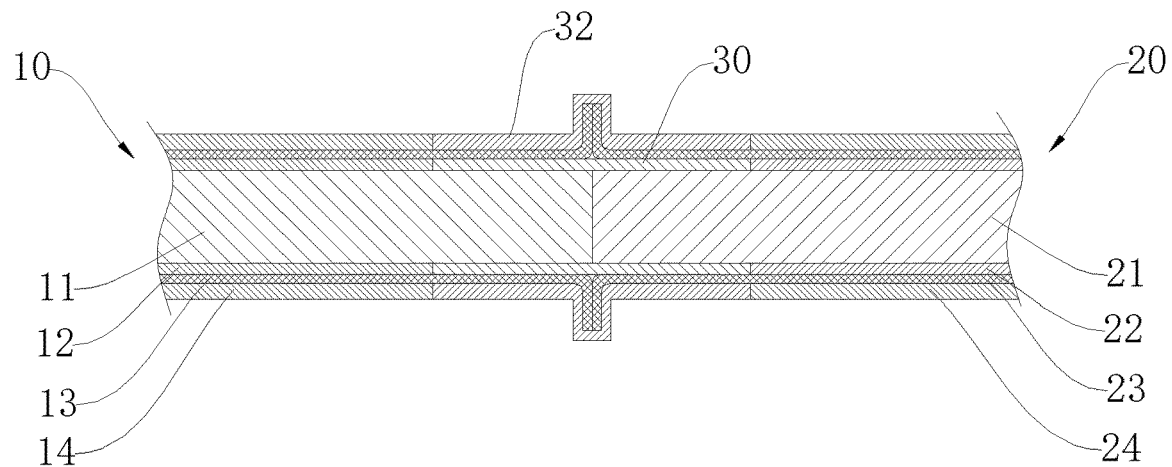
FIG. 1 illustrates a schematic diagram of a cross-sectional structure of a cable assembly according to an embodiment of the present disclosure.

As illustrated in FIG. 1, an embodiment of the present disclosure provides a cable assembly, which includes a first cable 10 and a second cable 20. The electromagnetic shielding structures in the first cable 10 and the second cable 20 are electrically connected, thereby realizing the continuity of the electromagnetic shielding structures of the first cable 10 and the second cable 20, and effectively improving the electromagnetic shielding effect of the cable assembly.

Specifically, in the embodiment of the present disclosure, the first cable 10 includes a first cable core 11 and a first shielding layer 13. A periphery of the first cable core 11 is wrapped by a first protective layer 12, and the first shielding layer 13 is disposed on an outer side of the first protective layer 12.

The main function of the first cable core 11 is to transmit electric energy. In specific configurations, the first cable core 11 may be made of a material with good electrical conductivity such as copper or aluminum.

The first protective layer 12 is wrapped around an outer side of the first cable core 11, thereby providing a good protection for the first cable core 11. In specific configurations, the first protective layer 12 may be made of an insulation material including one or more selected from the group consisting of polyvinyl chloride, polyurethane, nylon, polypropylene, silicone rubber, crosslinked polyolefin, synthetic rubber, polyurethane elastomer, crosslinked polyethylene and polyethylene, thereby providing a good electrical insulation performance for the first cable core 11.

The first shielding layer 13 is disposed on the outer side of the first protective layer 12 to provide electromagnetic shielding for the first cable core 11. An electromagnetic signal will be generated when current is applied to the first cable core 11, and the first shielding layer 13 can shield the electromagnetic signal to prevent the electromagnetic signal from being transmitted to the external environment. In specific configurations, the first shielding layer 13 may be woven by metal wires, thereby achieving good flexibility.

The second cable 20 includes a second cable core 21 and a second shielding layer 23. A periphery of the second cable core 21 is wrapped by a second protective layer 22, and the second shielding layer 23 is disposed on an outer side of the second protective layer 22.

The main function of the second cable core 21 is to transmit electric energy. In specific configurations, the second cable core 21 may be made of a material with good electrical conductivity such as copper or aluminum.

The second protective layer 22 is wrapped around an outer side of the second cable core 21, thereby providing a good protection for the second cable core 21. In specific configurations, the second protective layer 22 max be made of an insulation material including one or more selected from the group consisting of polyvinyl chloride, polyurethane, nylon, polypropylene, silicone rubber, crosslinked polyolefin, synthetic rubber, polyurethane elastomer, crosslinked polyethylene and polyethylene, thereby providing a good electrical insulation performance for the second cable core 21.

The second shielding layer 23 is disposed on the outer side of the second protective layer 22 to provide electromagnetic shielding for the second cable core 21. An electromagnetic signal will be generated when current is applied to the second cable core 21, and the second shielding layer 23 can shield the electromagnetic signal to prevent the electromagnetic signal from being transmitted to the external environment. In specific configurations, the second shielding layer 23 may be woven by metal wires, thereby achieving good flexibility.

A free end of the first cable core 11 is connected to a free end of the second cable core 21, so as to realize an electrical connection between the first cable core 11 and the second cable core 21. A free end of the first shielding layer 13 is connected to a free end of the second shielding layer 23, so as to realize an electrical connection between the shielding layers of the first cable 10 and the second cable 20, thereby ensuring the continuity of the electromagnetic shielding structure of the cable assembly, and effectively improving the electromagnetic shielding effect of the cable assembly.

Figure 6:
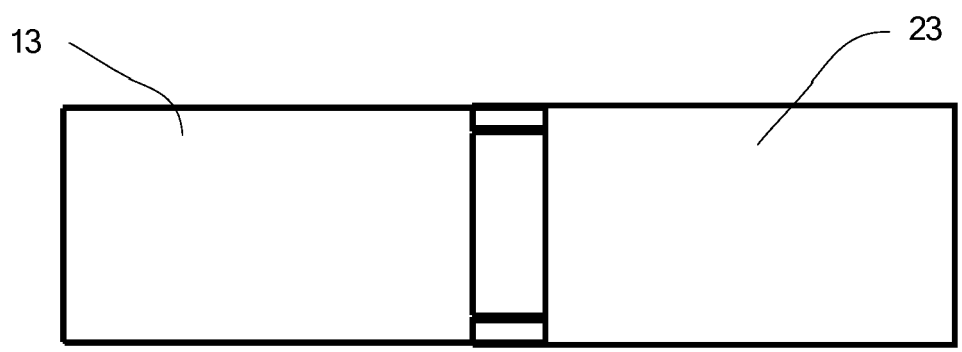
FIG. 6 illustrates a schematic diagram of a planar structure of shielding layers in symmetrical connection arrangement according to an embodiment of the present disclosure.
Figure 7:
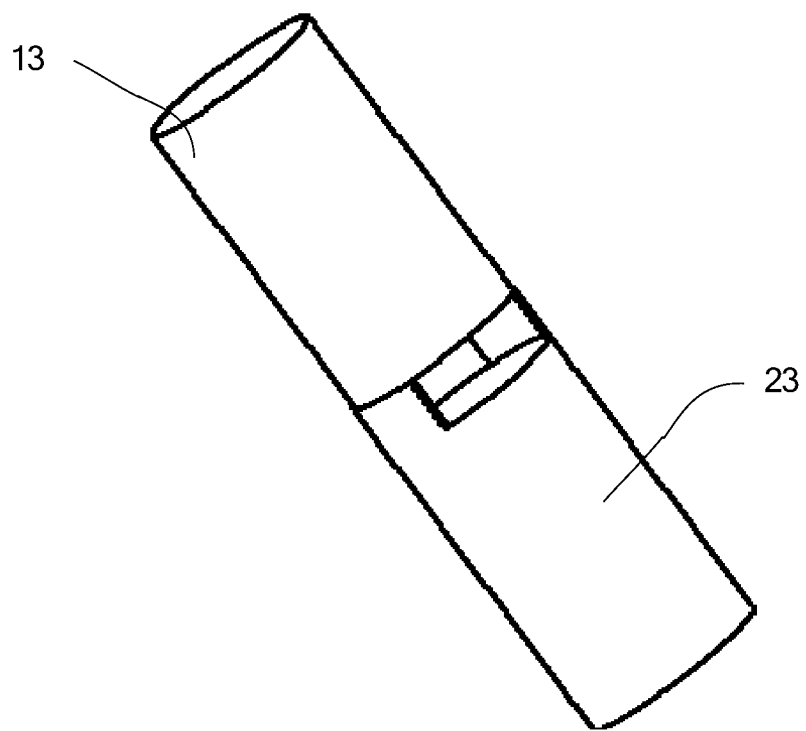
FIG. 7 illustrates a schematic diagram of a stereoscopic structure of shielding layers in symmetrical connection arrangement according to an embodiment of the present disclosure.

Referring to FIGS. 1, 6 and 7, connection positions between the first shielding layer 13 and the second shielding layer 23 are in symmetrical connection arrangement.

Figure 8:
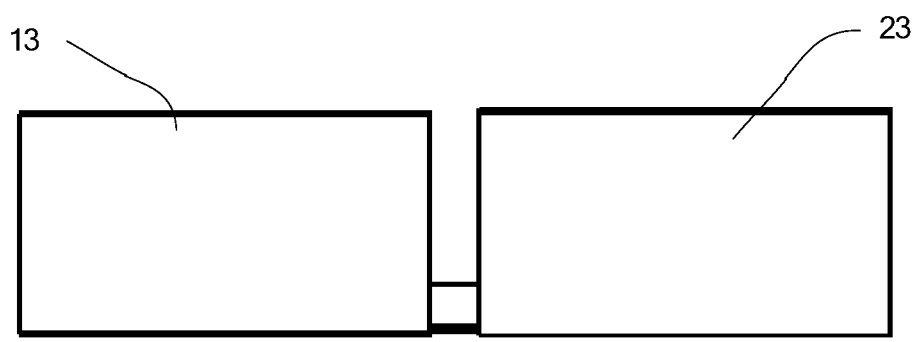
FIG. 8 illustrates a schematic diagram of a planar structure of shielding layers in asymmetrical connection arrangement according to an embodiment of the present disclosure.
Figure 9:
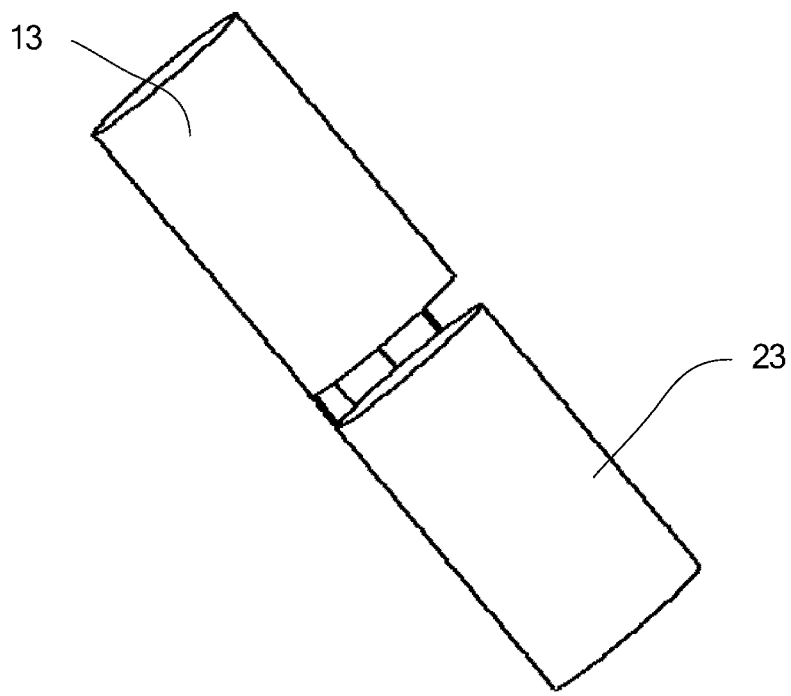
FIG. 9 illustrates a schematic diagram of a stereoscopic structure of shielding layers in asymmetrical connection arrangement according to an embodiment of the present disclosure.

Referring to FIGS. 8 and 9, if the connection position between the first shielding layer 13 and the second shielding layer 23 is a single spot, a large current will flow through the connection position to generate a magnetic field, which will be coupled with a magnetic field generated by the cable core, thereby causing a large radiation at the entire cable connection position, and seriously affecting the working condition of other electrical appliances. When the connection positions between the first shielding layer 13 and the second shielding layer 23 are symmetrical, the magnetic fields generated at the connection positions are in opposite directions and will offset each other to reduce the resultant magnetic field, thereby decreasing the radiation at the cable connection position, effectively reducing the magnetic field generated by the cable core and weakening the affection on other electrical appliances.

The connection position between the first shielding layer 13 and the second shielding layer 23 is in a 360° connection arrangement.

Compared with the symmetrical connection arrangement of the connection positions between the first shielding layer 13 and the second shielding layer 23, the 360° connection arrangement of the connection position between the first shielding layer 13 and the second shielding layer 23 is featured in that the first shielding layer 13 is completely wrapped around the first cable core 11 in a radial direction, and the second shielding layer 23 is completely wrapped around the second cable core 21 in the radial direction. In other words, the entire radial periphery of the cable core is wrapped by the shielding layer, which can greatly shield and offset the radiation generated by the cable core and the radiation generated by the shielding layer itself, thereby achieving an optimal shielding effect at the cable connection position.

The test method is as follows: a test instrument outputs a signal value (recorded as test value 2) to a first cable 10 or a second cable 20, and a detection device is disposed on an outer side of the cable assembly to detect a signal value (recorded as test value 1). A shielding performance value=test value 2 test value 1.

Table 1 shows the influence of the arrangement of the connection position between the first shielding layer and the second shielding layer on the shielding performance value.

TABLE 1

| Test parameter | Arrangement of the connection position between the shielding device and the shielding layer | | |
| --- | --- | --- | --- |
| | Asymmetrical arrangement | Symmetrical arrangement | 360° arrangement |
| Shielding performance value (dB) | 53 | 62 | 72 |

The above table shows the data obtained by performing a test on a selected cable with a certain wire diameter. The standard requirement is that the shielding performance value of the connection position between the first shielding layer and the second shielding layer is greater than 60 dB.

In a case where the connection positions between the first shielding layer 13 and the second shielding layer 23 have a same size, and are arranged asymmetrically, the shielding performance value thereof is less than 60 dB, which does not meet the standard requirement. When the connection positions are arranged symmetrically, even though the first shielding layer 13 and the second shielding layer 23 are not completely connected, the shielding performance value thereof still meets the standard requirement since the electromagnetic radiation is offset. Exemplarily, when the connection position between the first shielding layer 13 and the second shielding layer 23 is in a 360° connection arrangement, the shielding performance of the cable connection point is better.

During implementations, the free end of the first shielding layer 13 is lapped or butted with the free end of the second shielding layer 23.

Referring to FIG. 1, in an embodiment of the present disclosure, the free end of the first shielding layer 13 is connected to the free end of the second shielding layer 23 by butting.

Specifically, the free end (the right end in the figure) of the first shielding layer 13 has an evened portion, and the free end (the left end in the figure) of the second shielding layer 23 also has an everted portion. The connection between the first shielding layer 13 and the second shielding layer 23 is achieved by butting the evened portion of the first shielding layer 13 and the everted portion of the second shielding layer 23.

In order to ensure the stable connection between the first shielding layer 13 and the second shielding layer 23, the everted portion of the first shielding layer 13 and the everted portion of the second shielding layer 23 may be fixedly connected by welding, such as laser welding, ultrasonic welding, resistance welding, pressure diffusion welding, or soldering, etc., and the specific welding process is not limited in the present disclosure.

Figure 2:
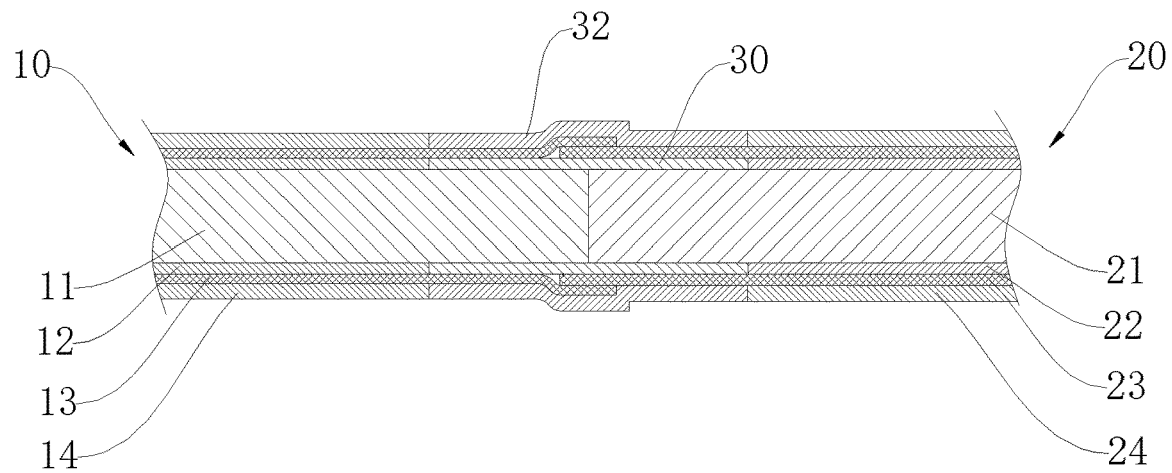
FIG. 2 illustrates a schematic diagram of a cross-sectional structure of another cable assembly according to an embodiment of the present disclosure.

Alternatively, as illustrated in FIG. 2, the first shielding layer 13 and the second shielding layer 23 may also be connected by lapping.

Specifically, the free end of the first shielding layer 13 may be disposed at a periphery of the free end of the second shielding layer 23, so as to achieve the lapping between the first shielding layer 13 and the second shielding layer 23.

In order to ensure the stable connection between the first shielding layer 13 and the second shielding layer 23, a lapped portion of the first shielding layer 13 and a lapped portion of the second shielding layer 23 may be fixedly connected by welding, such as laser welding, ultrasonic welding, resistance welding, pressure diffusion welding, or soldering, etc., and the specific welding process is not limited in the present disclosure.

In addition, the peripheries of the first shielding layer 13 and the second shielding layer 23 may be provided with an insulation protective layer 32 to improve the insulation reliability of the cable assembly, and to prevent the first shielding layer 13 and the second shielding layer 23 from being in conductive contact with an external conductor. In specific configurations, the insulation protective layer 32 may be a structural member with good insulation such as a heat shrinkable tube, and the specific material and type of the insulation protective layer may be adaptively selected according to actual requirements, which is not specifically limited in the present disclosure.

In specific configurations, the first cable core 11 has a protruding segment protruding out of the first protective layer 12, and the second cable core 21 has a protruding segment protruding out of the second protective layer 22, so as to facilitate the electrical connection between the first cable core 11 and the second cable core 21.

In addition, in order to provide a good protection for the connection position between the first cable core 11 and the second cable core 21, in the embodiment of the present disclosure, an isolation sleeve 30 is further disposed on an outer side of the connection position between the first cable core 11 and the second cable core 21. The isolation sleeve 30 may be disposed at peripheries of the protruding segments of the first cable core 11 and the second cable core 21.

In specific configurations, a thickness of the isolation sleeve 30 is greater than at least one selected from the group consisting of a thickness of the first protective layer 12 and a thickness of the second protective layer 22.

In specific configurations, the isolation sleeve 30 may be a heat shrinkable tube, or be made of an insulation material including one or more selected from the group consisting of polyvinyl chloride, poly urethane, nylon, polypropylene, silicone rubber, cross-linked polyolefin, synthetic rubber, polyurethane elastomer, cross-linked polyethylene and polyethylene, and injection molded on an outer side of the butt connection position.

A left end of the isolation sleeve 30 may be butted with the first protective layer 12 of the first cable 10, and a right end of the isolation sleeve 30 may be butted with the second protective layer 22 of the second cable 20, so as to well protect the first cable core 11 and the second cable core 21.

In specific configurations, the free end of the first cable core 11 and the free end of the second cable core 21 may be connected by butting or lapping.

For example, as illustrated in FIGS. 1 and 2, an end face of the free end of the first cable core 11 is butted with an end face of the free end of the second cable core 21. During implementations, in order to ensure the stable connection between the first cable core 11 and the second cable core 21, the end face of the free end of the first cable core 11 and the end face of the free end of the second cable core 21 may be connected by welding such as laser welding, ultrasonic welding, resistance welding, pressure diffusion welding, or soldering, etc., or by crimping, and the specific welding or crimping process is not limited in the present disclosure.

Figure 3:
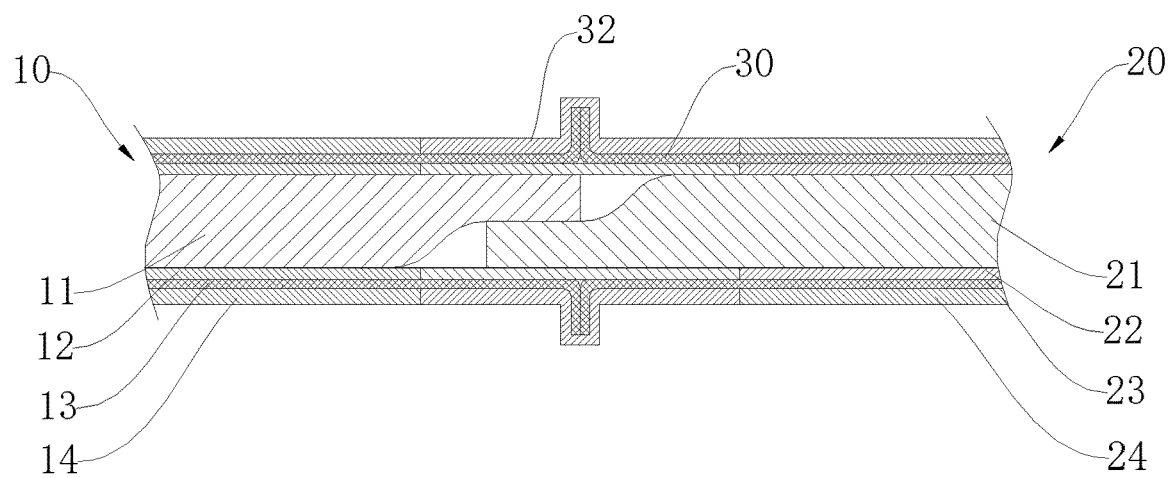
FIG. 3 illustrates a schematic diagram of a cross-sectional structure of still another cable assembly according to an embodiment of the present disclosure.

As illustrated in FIG. 3, the free end of the first cable core 11 may be lapped with the free end of the second cable core 21. That is, the right end of the first cable core 11 and the left end of the second cable core 21 have overlapping areas. During implementations, in order to ensure the stable connection between the first cable core 11 and the second cable core 21, the free end of the first cable core 11 and the free end of the second cable core 21 (i.e., the overlapping areas of the first cable core 11 and the second cable core 21) may be connected by welding such as laser welding, ultrasonic welding, resistance welding, pressure diffusion welding, or soldering, etc., or by crimping, and the specific welding or crimping process is not limited in the present disclosure.

A minimum cross-sectional area of a lapped or butted position between the first cable core 11 and the second cable core 21 may be greater than or equal to a smallest one of a cross-sectional area of the first cable core 11 and a cross-sectional area of the second cable core 21, so as to avoid the cable resistance from being too large due to the small cross-sectional area of the lapped or butted position between the first cable core and the second cable core, thereby preventing the temperature rise value from exceeding the standard requirement when the current is applied.

The thicknesses of the first shielding layer 13 and the second shielding layer 23 may be 0.003 mm to 27 mm.

The test method is as follows: a test instrument outputs a signal value (recorded as test value 2) to a first cable 10 or a second cable 20, and a detection device is disposed outside the cable assembly to detect a signal value (recorded as test value 1). A shielding performance value=test value 2 test value 1.

Table 2 shows an influence of thicknesses of the shielding layer and the conductive device on the shielding performance and performance of the first cable 10 and the second cable 20 changes little without a significant increase. When the thicknesses of the first shielding layer 13 and the second shielding layer 23 are 0.003 mm to 27 mm, the bending radius increments of the first cable 10 and the second cable 20 increase along with the increase of the thickness. But when the thicknesses of the first shielding layer 13 and the second shielding layer 23 are greater than 27 mm, the bending radius increments of the first cable 10 and the second cable 20 increase by more than 200 mm, which is not conducive to the actual processing. Therefore, it is preferable that the thicknesses of the first shielding layer 13 and the second shielding layer 23 are 0,003 mm to 27 mm.

In addition, a minimum cross-sectional area of a lapped or butted position between the free end of the first shielding layer 13 and the free end of the second shielding layer 23 is 60% to 260% of a smallest on of a cross-sectional area of the first shielding layer 13 and a cross-sectional area of the second shielding layer 23, thereby ensuring the connection effect between the free end of the first shielding layer 13 and the free end of the second shielding layer 23.

The main function of the first shielding layer 13 and the second shielding layer 23 is to ground the eddy current generated by the current-conducted cable core to avoid the electromagnetic interference. The larger the cross-sectional area of the cable core, the larger the current that the cable core can conducted, and thus the larger the eddy current generated in the shielding layer. When the minimum cross-sectional area of the connection position between the first

TABLE 2

| Test parameter | Thickness of the shielding layer (mm) | | | | | | | | | | |
| --- | --- | --- | --- | --- | --- | --- | --- | --- | --- | --- | --- |
| | 0.001 | 0.003 | 0.005 | 0.01 | 0.05 | 0.1 | 0.2 | 0.4 | 0.6 | 0.8 | 1 |
| Shielding performance value (dB) | 55 | 60.3 | 62.7 | 64.8 | 66.1 | 68.8 | 70.5 | 72.1 | 73.8 | 74.3 | 76.8 |
| Bending radius increment (mm) | 1 | 1.1 | 1.3 | 1.5 | 2.1 | 2.4 | 2.5 | 2.9 | 3.4 | 3.7 | 4 |

| Test parameter | Thickness of the shielding layer (mm) | | | | | | | | | |
| --- | --- | --- | --- | --- | --- | --- | --- | --- | --- | --- |
| | 3 | 5 | 10 | 15 | 20 | 25 | 26 | 27 | 28 | 29 | 30 |
| Shielding performance value (dB) | 78.4 | 80.7 | 82.2 | 85.6 | 87.7 | 90.2 | 93.1 | 95.7 | 95.3 | 95.6 | 95.3 |
| Bending radius increment (mm) | 5 | 6 | 9.7 | 15.5 | 77 | 178 | 183 | 189 | 211 | 231 | 253 |

The above table shows the data obtained by performing a test on a selected cable with a certain wire diameter. The standard requirement is that the shielding performance value of the connection position between the conductive device 31 and the shielding layer is greater than 60 dB.

According to the test results shown in the table, when the thicknesses of the first shielding layer 13 and the second shielding layer 23 are 0.003 mm to 27 mm, the shielding performance of the first cable 10 and the second cable 20 increases along with the increase of the thickness. But when the thicknesses of the first shielding layer 13 and the second shielding layer 23 are greater than 27 mm, the shielding shielding layer 13 and the second shielding layer 23 is less than the standard requirement, local heat will be generated at the connection position, and in severe cases, the connection position between the first shielding layer 13 and the second shielding layer 23 will be burned, resulting in degradation or failure of the shielding performance.

Table 3 shows the influence of a ratio of the minimum cross-sectional area of the connection position between the first shielding layer and the second shielding layer to the smallest one of a cross-sectional area of the first shielding layer and a cross-sectional area of the second shielding layer on a temperature rise value between the shielding layers.

TABLE 3

Ratio of the minimum cross-sectional area of the connection position between the first shielding layer and the second shielding layer to the smallest one of a cross-sectional area of the first shielding layer and a cross-sectional area of the second shielding layer (%)

| 20 | 40 | 60 | 80 | 100 | 120 | 140 | 160 | 180 | 200 | 220 | 240 | 260 | 280 | 300 | 320 |
|----|----|----|----|-----|-----|-----|-----|-----|-----|-----|-----|-----|-----|-----|-----|

Temperature rise value between the conductive device and the first shielding layer (° C.)

| 59 | 55 | 48 | 46 | 42 | 40 | 37 | 34 | 31 | 28 | 25 | 23 | 21 | 22 | 20 | 21 |
|----|----|----|----|----|----|----|----|----|----|----|----|----|----|----|----|

The above table shows the data obtained by performing a test on a selected cable with a certain wire diameter. The standard requirement is that the temperature rise value between the first shielding layer 13 and the second shielding layer 23 is less than 50° C.

As can be seen from the above table, when the ratio of the minimum cross-sectional area of the connection position between the first shielding layer 13 and the second shielding layer 23 to the smallest one of a cross-sectional area of the first shielding layer 13 and a cross-sectional area of the second shielding layer 23 is less than 60%, the temperature rise value between the shielding layers does not meet the standard requirement.

When the ratio of the minimum cross-sectional area of the connection position between the first shielding layer 13 and the second shielding layer 23 to the smallest one of a cross-sectional area of the first shielding layer 13 and a cross-sectional area of the second shielding layer 23 is more than 260%, since the cross-sectional areas of the first shielding layer 13 and the second shielding layer 23 are already much larger than a minimum conduction area of the eddy current, the temperature rise value between the first shielding layer 13 and the second shielding layer 23 is the same as that when the ratio is 260%, hut the spent cost and the processing cycle are increased.

Therefore, it is preferable that the minimum cross-sectional area of the lapped or butted position between free end of the first shielding layer 13 and the free end of the second shielding layer 23 is 60% to 260% of the smallest one of a cross-sectional area of the first shielding layer 13 and a cross-sectional area of the second shielding layer 23.

In specific configurations, an impedance of the connection position between the first shielding layer 13 and the second shielding layer 23 is less than 13.7 mΩ.

Exemplarily, the impedance of the connection position between the first shielding layer 13 and the second shielding layer 23 is less than 12.5 mΩ.

The impedance of the connection position between the first shielding layer 13 and the second shielding layer 23 should be as small as possible, so that the current generated by the shielding layer can flow back to an energy source or a grounded position without hindrance. If the impedance of the connection position between the first shielding layer 13 and the second shielding layer 23 is large, large current will be generated at the connection position between the first shielding layer 13 and the second shielding layer 23, thereby causing a large radiation at the cable connection position.

Table 4 shows the influence of the impedance of the connection position between the first shielding layer and the second shielding layer on the shielding performance.

TABLE 4

| Test | Impedance (mΩ) of the connection position between the first shielding layer and the second shielding layer | | | | | | | | | | |
|---|---|---|---|---|---|---|---|---|---|---|---|
| parameter | 9.1 | 9.7 | 10.1 | 11.3 | 11.9 | 12.5 | 13.1 | 13.7 | 14.3 | 14.9 | 15.5 |
| Shielding performance value (dB) | 72 | 71 | 70 | 70 | 69 | 68 | 65 | 62 | 55 | 51 | 47 |

The above table shows the data obtained by performing a test on a selected cable with a certain wire diameter. The standard requirement is that the shielding performance value of the connection position between the first shielding layer 13 and the second shielding layer 23 is less than 6 dB, and the shielding performance value of the connection position between the first shielding layer 13 and the second shielding layer 23 is less than 4 dB.

When the impedance of the connection position between the first shielding layer 13 and the second shielding layer 23 is greater than 13.7 mΩ, the shielding performance value of the connection position between the first shielding layer 13 and the second shielding layer 23 is greater than 6 dB, and the resistance to RF interference at the connection position between the first shielding layer 13 and the second shielding layer 23 is greater than 4 dB, which does not meet the standard requirement. Moreover, when the impedance of the connection position between the first shielding layer 13 and the second shielding layer 23 is less than 12.5 mΩ, the shielding performance value of the connection position between the first shielding layer 13 and the second shielding layer 23 changes little. Therefore, the inventor sets the impedance of the connection position between the first shielding layer 13 and the second shielding layer 23 to be less than 13.7 mΩ.

Exemplarily, the impedance of the connection position between the first shielding layer 13 and the second shielding layer 23 is less than 12.5 mΩ.

During practical applications, the first cable 10 may generally include a third protective layer 14 (which may also be understood as an outer cover), and the second cable 20 may generally include a fourth protective layer 24 (which may also be understood as an outer cover).

Specifically, the third protective layer 14 is disposed on an outer side of the first shielding layer 13 to prevent the first shielding layer 13 from being in conductive contact with other components, thereby improving the use safety of the first cable 10, and further improving the overall waterproof and dustproof performance of the first cable 10.

During implementations, the third protective layer 14 may be made of an insulation material including one or more selected from the group consisting of polyvinyl chloride, polyurethane, nylon, polypropylene, silicone rubber, crosslinked polyolefin, synthetic rubber, polyurethane elastomer, crosslinked polyethylene and polyethylene.

Correspondingly, in the second cable 20, the fourth protective layer 24 is disposed on an outer side of the second shielding layer 23 to prevent the second shielding layer 23 from being in conductive contact with other components, thereby improving the use safety of the second cable 20, and further improving the overall waterproof and dustproof performance of the second cable 20.

During implementations, the fourth protective layer 24 may be made of an insulation material including one or more selected from the group consisting of polyvinyl chloride, polyurethane, nylon, polypropylene, silicone rubber, crosslinked polyolefin, synthetic rubber, polyurethane elastomer, crosslinked polyethylene and polyethylene.

Embodiment 2

The embodiment provides a solution of connecting shielding nets of cables by a conductive device.

In the embodiment, the first shielding layer 13 and the second shielding layer 23 may also be connected by an additional conductive device 31.

The cable assembly further includes a conductive device 31 disposed at a part of a periphery of the first cable core 11 and a part of a periphery of the second cable core 21. An end of the conductive device 31 is connected to a free end of the first shielding layer 13, and a second end of the conductive device 31 is connected to a free end of the second shielding layer 23. When is the connection length between the first shielding layer 13 and the second shielding layer 23 is insufficient, the conductive device 31 may be used for transitional connection, and also can ensure the shielding effect at the connection position.

The connection, positions between an end of the conductive device 31 and the free end of the first shielding layer 13 are in a symmetrical connection arrangement, and the connection positions between the second end of the conductive device 31 and the free end of the second shielding layer 23 are in a symmetrical connection arrangement.

If the connection position between the conductive device 31 and the shielding layer is a single spot, a large current will flow through the connection position to generate a magnetic field, which will be coupled with a magnetic field generated by the cable core, thereby causing a large radiation at the whole cable connection position, and seriously affecting the working condition of other electrical appliances. When the connection positions between the conductive device 31 and the shielding layer are symmetrical, the magnetic fields generated at the connection positions are in opposite directions and will offset each other to reduce the resultant magnetic field, thereby decreasing the radiation at the cable connection position, effectively reducing the magnetic field generated by the cable core and weakening the affection on other electrical appliances.

The connection position between the first end of the conductive device 31 and the free end of the first shielding layer 13 is in a 360° connection arrangement, i.e., the first end of the conductive device 31 is completely butted with the free end of the first shielding layer 13. The connection position between the second end of the conductive device 31 and the free end of the second shielding layer 23 is in a 360° connection arrangement, i.e., the second end of the conductive device 31 is completely butted with the free end of the second shielding layer 23.

Compared with the symmetrical connection arrangement of the connection positions between the conductive device 31 and the shielding layer, the 360° connection arrangement of the connection position between the conductive device 31 and the shielding layer can greatly shield and offset the radiation generated by the cable core and the radiation generated by the shielding layer itself, thereby achieving an optimal shielding effect at the cable connection position.

The test method is as follows: a test instrument outputs a signal value (recorded as test value 2) to a first cable 10 or a second cable 20, and a detection device is disposed outside the cable assembly to detect a signal value (recorded as test value 1). A shielding performance value=test value 2 test value 1.

Table 5 shows the influence of the arrangement of connection position between the conductive device and the shielding layer on the shielding performance.

TABLE 5

| Test parameter | Arrangement of the connection positions between the conductive device and the shielding layer | | |
| --- | --- | --- | --- |
| | Asymmetrical arrangement | Symmetrical arrangement | 360° arrangement |
| Shielding performance value (dB) | 55 | 63 | 72 |

The above table shows the data obtained by performing a test on a selected cable with a certain wire diameter. The standard requirement is that the shielding performance value of the connection position between the conductive device and the shielding layer is greater than 60 dB.

In a case where the connection positions between the conductive device 31 and the shielding layer have a same size, when the connection positions are arranged asymmetrically, the shielding performance value thereof is less than 60 dB, which does not meet the standard requirement. When the connection positions are arranged symmetrically, even though the conductive device 31 and the shielding layer are not completely connected, the shielding performance value thereof still meets the standard requirement since the electromagnetic radiation is offset. Exemplarily, when the connection position between the conductive device 31 and the shielding layer is in a 360° connection arrangement, the shielding performance of the cable connection point is better.

When the free end of the first shielding layer 13 and the free end of the second shielding layer 23 are connected by the conductive device 31, the conductive device 31 and the first shielding layer 13 may be connected by butting or lapping. Correspondingly, the conductive device 31 and the second shielding layer 23 may be connected by butting or lapping, so as to improve the connection effect between the first shielding layer 13 and the second shielding layer 23.

The connection mode of the first shielding layer 13 and the second shielding layer 23 can be referred to for the connection between the first end of the conductive device 31 and the free end of the first shielding layer 13, or the connection between the second end of the conductive device 31 and the free end of the second shielding layer 23, and the connection may be made by welding such as laser welding, ultrasonic welding, resistance welding, pressure diffusion welding, or soldering, etc.

In addition, during implementations, an insulation protective layer 32 may be disposed at the connection positions between the first shielding layer 13, the conductive device 31 and the second shielding layer 23 and at the periphery of the conductive device 31. A left end of the insulation protective layer 32 may be butted or sleeved with the third protective layer 14 of the first cable 10. A right end of the insulation protective layer 32 may be butted or sleeved with the fourth protective layer 24 of the second cable 20 to improve the reliability of the cable assembly. The first shielding layer 13, the conductive device 31, and the second shielding layer 23 are in conductive contact with the external conductor. In specific configurations, the insulation protective layer 32 may be a structural member with good insulation such as a heat shrinkable tube, and the specific material and type of the insulation protective layer 32 may be adaptively selected according to the actual needs, which will not be specifically limited in the present disclosure.

Figure 4:
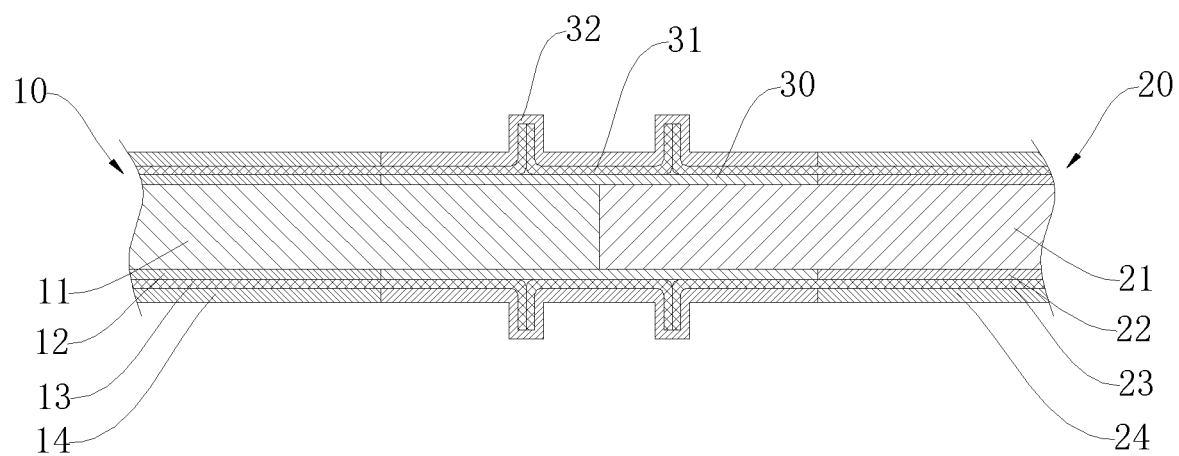
FIG. 4 illustrates a schematic diagram of a cross-sectional structure of still another cable assembly according to an embodiment of the present disclosure.

For example, as illustrated in FIG. 4, in another embodiment of the present disclosure, the first shielding, layer 13 and the second shielding layer 23 are connected by the conductive device 31.

The first shielding layer 13 and the conductive device 31 may be connected by butting, and the second shielding layer 23 and the conductive device 31 may also be connected by butting.

Specifically, the free end of the first shielding layer 13 has an everted portion, and the free end (the left end in the figure) of the conductive device 31 also has an everted portion. The connection between the first shielding layer 13 and the conductive device 31 can be realized by butting the evened portion of the first shielding layer 13 with the everted portion of the left end of the conductive device 31. The free end of the second shielding layer 23 has an everted portion, and the second end (the right end in the figure) of the conductive device 31 also has an everted portion. The connection between the second shielding layer 23 and the conductive device 31 can be realized by butting the everted portion of the second shielding layer 23 with the evened portion of the right end of the conductive device 31.

In order to ensure the stable connection between the first shielding layer 13 and the conductive device 31, the everted portion of the first shielding layer 13 and the everted portion of the conductive device 31 may be fixedly connected by welding, such as laser welding, ultrasonic welding, resistance welding, pressure diffusion welding, or soldering, etc., and the specific welding process is not limited in the present disclosure. In addition, in order to ensure the stable connection between the second shielding layer 23 and the conductive device 31, the everted portion of the second shielding layer 23 and the evened portion of the conductive device 31 may be fixedly connected by welding, such as laser welding, ultrasonic welding, resistance welding, pressure diffusion welding, or soldering, etc., and the specific welding process is not limited in the present disclosure.

Figure 5:
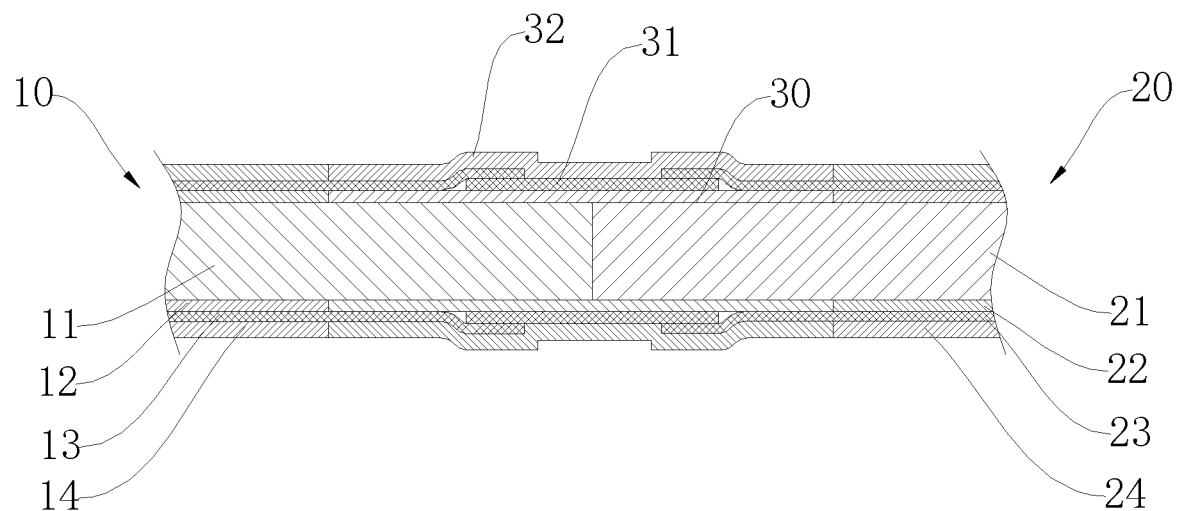
FIG. 5 illustrates a schematic diagram of a cross-sectional structure of still another cable assembly according to an embodiment of the present disclosure.

Alternatively, as illustrated in FIG. 5, the first shielding layer 13 and the conductive device 31 may be connected by lapping, and the second shielding layer 23 and the conductive device 31 may also be connected by lapping.

Specifically, the free end of the first shielding layer 13 may be disposed at the periphery of the left end of the conductive device 31, thereby realizing the lapping between the first shielding layer 13 and the conductive device 31. The free end of the second shielding layer 23 may be disposed at the periphery of the right end of the conductive device 31, thereby realizing the lapping between the second shielding layer 23 and the conductive device 31.

In order to ensure the stable connection between the first shielding layer 13 and the conductive device 31, a butted portion of the first shielding layer 13 and an butted portion of the conductive device 31 may be fixedly connected by welding, such as laser welding, ultrasonic welding, resistance welding, pressure diffusion welding, or soldering, etc., and the specific welding process is not limited in the present disclosure. In addition, in order to ensure the stable connection between the second shielding layer 23 and the conductive device 31, a butted portion of the second shielding layer 23 and a butted portion of the conductive device 31 may be fixedly connected by welding, such as laser welding, ultrasonic welding, resistance welding, pressure diffusion welding, or soldering, etc., and the specific welding process is not limited in the present disclosure.

The thicknesses of the first shielding layer 13, the second shielding layer 23 and the conductive device 31 may be 0.003 mm to 27 mm.

Referring to Table 1, according to the test results shown in the table, when the thicknesses of the first shielding layer 13, the second shielding layer 23 and the conductive device 31 are 0.003 mm to 27 mm, the shielding effect (i.e., shielding performance) of the first cable 10 and the second cable 20 increases along with the increase of the thickness. But when the thicknesses of the first shielding layer 13, the second shielding layer 23 and the conductive device 31 are greater than 27 mm, the shielding performance of the first cable 10 and the second cable 20 changes little without a significant increase. When the thicknesses of the first shielding layer 13, the second shielding layer 23 and the conductive device 31 are 0.003 mm to 27 mm, the bending radius increments of the first cable 10 and the second cable 20 increase along with the increase of the thickness. But when the thicknesses of the first shielding layer 13, the second shielding layer 23 and the conductive device 31 are greater than 27 mm, the bending radius increments of the first cable 10 and the second cable 20 increase by more than 200 mm, which is not conducive to the actual processing. Therefore, it is preferable that the thicknesses of the first shielding layer 13, the second shielding layer 23 and the conductive device 31 are 0.003 mm to 27 mm.

In addition, a minimum cross-sectional area of a lapped or butted position between the conductive device 31 and the first shielding layer 13 or the second shielding layer 23 is 60% to 260% of a smallest one of a cross-sectional area of the first shielding layer 13 and a cross-sectional area of the second shielding layer 23, thereby ensuring connection effect between the conductive device 31 and the first shielding layer 13 or the second shielding layer 23.

The main function of the first shielding layer 13 and the second shielding layer 23 is to ground the eddy current generated by the current-conducted cable core to avoid the electromagnetic interference. The larger the cross-sectional area of the cable core, the larger the current that the cable core can conduct, and thus the larger the eddy current generated in the shielding layer. When the minimum cross-sectional area of the connection position between the conductive device 31 and the first shielding layer 13 or the second shielding layer 23 is less than the standard requirement, local heat will be generated at the connection position, and in severe cases, the connection position between the conductive device 31 and the first shielding layer 13 or the second shielding layer 23 will be burned, resulting in degradation or failure of the shielding performance.

Table 6 shows the influence of a ratio of the minimum cross-sectional area of the connection position between the conductive device and the first shielding layer or the second shielding layer to the smallest one of the cross-sectional area of the first shielding layer and the cross-sectional area of the second shielding layer on a temperature rise value between the conductive device and the first shielding layer or the second shielding layer.

TABLE 6

Ratio of the minimum cross-sectional area of the connection position between the conductive device and the first shielding layer or the second shielding layer to the smallest one of the cross-sectional area of the first shielding layer and the cross-sectional area of the second shielding layer (%)

| 20 | 40 | 60 | 80 | 100 | 120 | 140 | 160 | 180 | 200 | 220 | 240 | 260 | 280 | 300 | 320 |
|---|---|---|---|---|---|---|---|---|---|---|---|---|---|---|---|
| Temperature rise value between the conductive device and the first shielding layer or the second shielding layer (° C.) ||||||||||||||||
| 61 | 56 | 49 | 46 | 44 | 41 | 38 | 36 | 34 | 30 | 27 | 24 | 21 | 21 | 20 | 21 |

The above table shows the data obtained by performing a test on a selected cable with a certain wire diameter. The standard requirement is that the temperature rise value between the conductive device and the first shielding layer 13 and the second shielding layer 23 is less than 50° C.

As can be seen from the above table, when the ratio of the minimum cross-sectional area of the connection position between the conductive device 31 and the first shielding layer 13 or the second shielding layer 23 to the smallest on of the cross-sectional area of the first shielding layer 13 and the cross-sectional area of the second shielding layer 23 is less than 60%, the temperature rise between the conductive device 31 and the first shielding layer 13 or the second shielding layer 23 does not meet the standard requirement.

When the ratio of the minimum cross-sectional area of the connection position between the conductive device 31 and the first shielding layer 13 or the second shielding layer 23 to the smallest one of the cross-sectional area of the first shielding layer 13 and the cross-sectional area of the second shielding layer 23 is more than 260%, since the cross-sectional areas of the first shielding layer 13 and the second shielding layer 23 are already much larger than a minimum conduction area of the eddy current, the temperature rise value between the conductive device 31 and the first shielding layer 13 or the second shielding layer 23 is substantially the same as that when the ratio is 260%, but the spent cost and the processing cycle are increased.

Therefore, it is preferable that the minimum cross-sectional area of the lapped or butted position between the conductive device 31 and the first shielding layer 13 or the second shielding layer 23 is 60% to 260% of the smallest one of the cross-sectional area of the first shielding layer 13 and the cross-sectional area of the second shielding layer 23.

In specific configurations, an impedance of the connection position between an end of the conductive device and the free end of the first shielding layer is less than 13.7 mΩ, and an impedance of the connection position between the second end of the conductive device and the free end of the second shielding layer is less than 13.7 mΩ.

Exemplarily, the impedance of the connection position between an end of the conductive device and the free end of the first shielding layer is less than 12.5 mΩ, and the impedance of the connection position between the second end of the conductive device and the free end of the second shielding layer is less than 12.5 mΩ.

The impedance of the connection position between the conductive device and the shielding layer should be as small as possible, so that the current generated by the shielding layer can flow back to an energy source or a grounded position without hindrance. If the impedance of the connection position between the conductive device and the shielding layer is large, large current will be generated at the connection position between the conductive device and the shielding layer, thereby causing a large radiation at the cable connection joint.

The test method is as follows: a test instrument outputs a signal value (recorded as test value 2) to a first cable or a second cable, and a detection device is disposed outside the cable assembly to detect a signal value (recorded as test value 1). A shielding performance value=test value 2 test value 1.

Table 7 shows the influence of the impedance of the connection position between the conductive device and the shielding layer on the shielding performance.

TABLE 7

| | Impedance (mΩ) of the connection position between the conductive device and the shielding layer |||||||||||
|---|---|---|---|---|---|---|---|---|---|---|---|
| Test parameter | 9.1 | 9.7 | 10.1 | 11.3 | 11.9 | 12.5 | 13.1 | 13.7 | 14.3 | 14.9 | 15.5 |
| Shielding performance value (dB) | 72 | 71 | 70 | 69 | 69 | 68 | 64 | 61 | 56 | 51 | 48 |

The above table shows the data obtained by performing a test on a selected cable with a certain wire diameter. The standard requirement is that the shielding performance value of the connection position between the conductive device and the shielding layer is greater than 60 dB.

When the impedance of the connection position between an end of the conductive device and the free end of the first shielding layer is greater than 13.7 mΩ, and the impedance of the connection position between the second end of the conductive device and the free end of the second shielding layer is greater than 137 mΩ, the shielding performance value of the connection position between the conductive device and the shielding layer is less than 60 dB, which does not meet the standard requirement. Moreover, when the impedance of the connection position between an end of the conductive device and the free end of the first shielding layer is less than 12.5 mΩ, and the impedance of the connection position between the second end of the conductive device and the free end of the second shielding layer is less than 12.5 mΩ, the shielding performance value of the connection position between the conductive device and the shielding layer changes little. Therefore, the inventor sets the impedance of the connection position between an end of the conductive device and the free end of the first shielding layer to be less than 13.7 mΩ, and the impedance of the connection position between the second end of the conductive device and the free end of the second shielding layer to be less than 13.7 mΩ.

Exemplarily, the impedance of the connection position between an end of the conductive device and the free end of the first shielding layer is less than 12.5 mΩ, and the impedance of the connection position between the second end of the conductive device and the free end of the second shielding layer is less than 12.5 mΩ.

During practical applications, the first cable 10 may generally include a third protective layer 14 (which may also be understood as an outer cover), and the second cable 20 may generally include a fourth protective layer 24 (which may also be understood as outer cover).

Specifically, the third protective layer 14 is disposed on an outer side of the first shielding layer 13 to prevent the first shielding layer 13 from being in conductive contact with other components, thereby improving the use safety of the first cable 10, and further improving the overall waterproof and dustproof performance of the first cable 10.

During implementations, the third protective layer 14 may be made of an insulation material including one or more selected from the group consisting of polyvinyl chloride, polyurethane, nylon, polypropylene, silicone rubber, crosslinked polyolefin, synthetic rubber, polyurethane elastomer, crosslinked polyethylene and polyethylene.

Correspondingly, in the second cable 20, the fourth protective layer 24 is disposed on an outer side of the second shielding layer 23 to prevent the second shielding layer 23 from being in conductive contact with other components, thereby improving the use safety of the second cable 20, and further improving the overall waterproof and dustproof performance of the second cable 20.

During implementations, the fourth protective layer 24 may be made of one or more selected from the group consisting of polyvinyl chloride, polyurethane, nylon, polypropylene, silicone rubber, crosslinked polyolefin, synthetic rubber, polyurethane elastomer, crosslinked polyethylene and polyethylene.

During manufacturing, the conductive device 31 may be a barrel structure made of a conductive material such as copper, aluminum, graphene, etc. Alternatively, the conductive device 31 may be a barrel structure woven by metal wires, thereby achieving certain flexibility to enlarge the application range and improve the seismic performance. The material and the manufacturing mode of the conductive device 31 are not limited in the present disclosure.

Embodiment 3

The embodiment provides a manufacturing method for a cable assembly.

Figure 10:
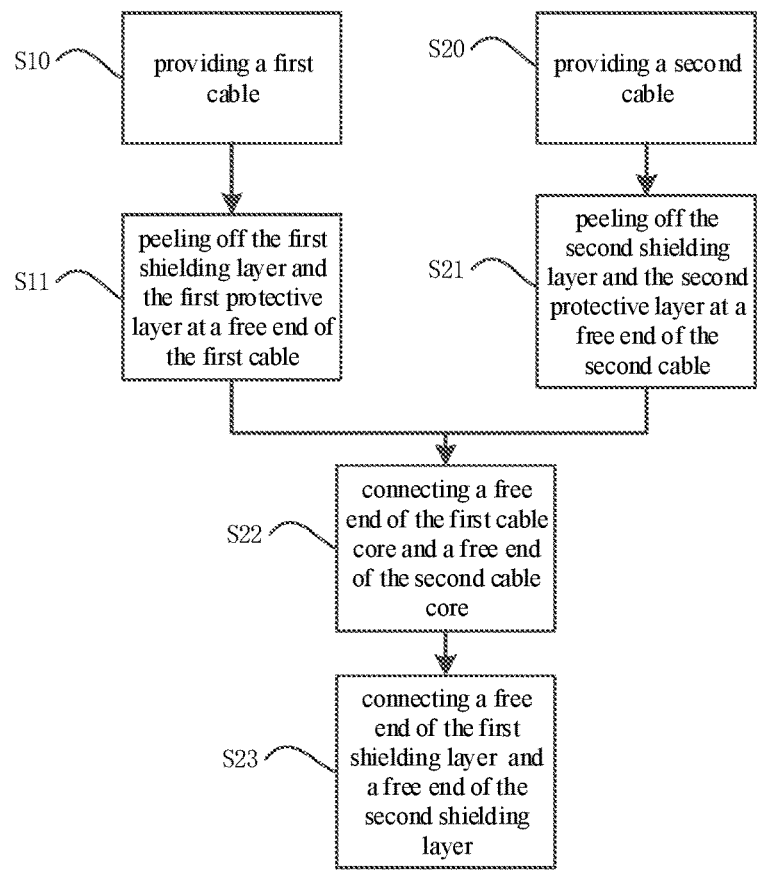
FIG. 10 illustrates a flowchart of a manufacturing method for a cable assembly according to an embodiment of the present disclosure.

When manufacturing a cable assembly, the following steps may be adopted:

Referring to FIGS. 1, 2 and 10, the method may include:

S10: providing a first cable 10. The first cable 10 includes a first cable core 11, a first protective layer 12 and a first shielding layer 13. The first protective layer 12 is disposed on an outer side of the first cable core 11, and the first shielding layer 13 is disposed on an outer side of the first protective layer 12.

S11: peeling off the first shielding layer 13 and the first protective layer 12 at a free end of the first cable 10 (a right end of the first cable 10 in FIG. 1) to expose the first cable core 11.

S20: providing a second cable 20. The second cable 20 includes a second cable core 21, a second protective layer 22 and a second shielding layer 23. The second protective layer 22 is disposed on an outer side of the second cable core 21, and the second shielding layer 23 is disposed on an outer side of the second protective layer 22.

S1: peeling off the second shielding layer 23 and the second protective layer 22 at a free end of the second cable 20 (a left end of the second cable 20 in FIG. 1) to expose the second cable core 21.

S22: connecting a free end of the first cable core 11 and a free end of the second cable core 21 to achieve an electrical connection between the first cable core 11 and the second cable core 21.

S23: connecting a free end of the first shielding layer 13 and a free end of the second shielding layer 23.

The first cable core 11 and the second cable core 21 may be connected by welding such as laser welding, ultrasonic welding, resistance welding, pressure diffusion welding, or soldering, etc., or by crimping, so as to improve the connection strength between the first cable core 11 and the second cable core 21.

In addition, the first shielding layer 13 and the second shielding layer 23 may be connected by welding such as laser welding, ultrasonic welding, resistance welding, pressure diffusion welding, or soldering, etc., so as to improve the connection strength between the first shielding layer 13 and the second shielding layer 23.

It can be understood that during implementations, the first cable core 11 and the second cable core 21 may also be connected in other ways so as to realize a conductive connection and a mechanical connection between the first cable core 11 and the second cable core 21. In addition, the first shielding layer 13 and the second shielding layer 23 may also be connected in other ways so as to realize a conductive connection and a mechanical connection between the first shielding layer 13 and the second shielding layer 23.

In addition, before step S23, the method may further include: disposing an isolation sleeve 30 at a periphery of a connection position between the first cable core 11 and the second cable core 21, so as to prevent undesirable conditions such as conductive contact between the connection position and the conductive device 31.

The isolation sleeve 30 may be a heat shrinkable tube, or any other insulation layers directly injection-molded at the periphery of the connection position.

In addition, in some embodiments, when a third protective layer 14 is disposed on an outer side of the first cable 10, step S11 further includes peeling off the third protective layer 14 of the first cable 10. Correspondingly, when a fourth protective layer 24 is disposed on an outer side of the second cable 20, step S21 further includes peeling off the fourth protective layer 24 of the second cable 20.

Figure 11:
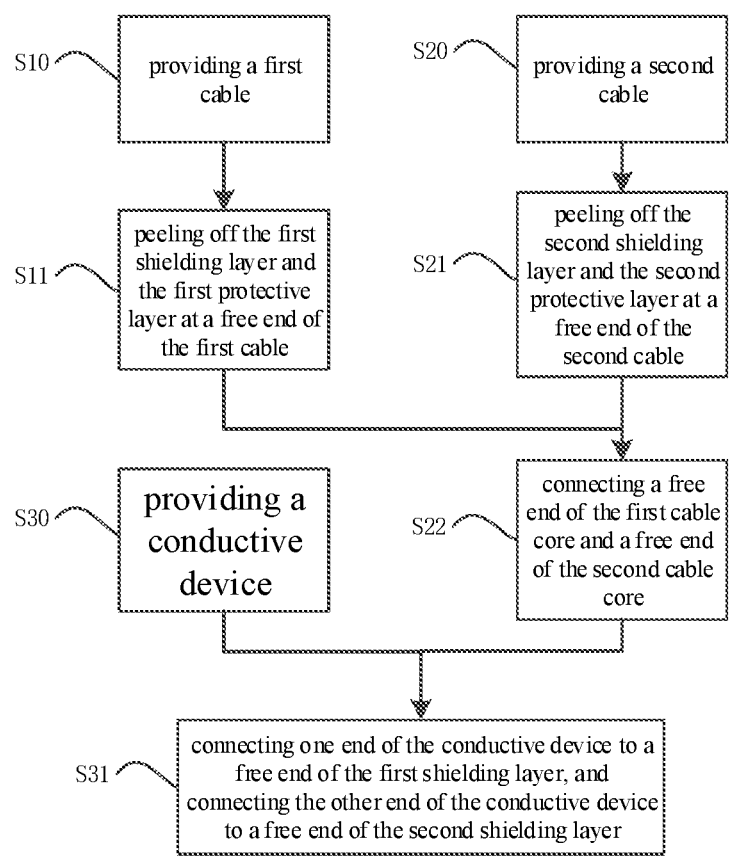
FIG. 11 illustrates a flowchart of another manufacturing method for a cable assembly according to an embodiment of the present disclosure.

In addition, as illustrated in FIG. 11, an embodiment of the present disclosure further provides another manufacturing method for a cable assembly. In the manufacturing method, steps S30 and S31 are added.

Specifically, referring to FIGS. 4, 5 and 11, the method further includes:

S30: providing and disposing a conductive device 31 at a part of the periphery of the first cable core 11 and a part of the periphery of the second cable core 21.

S31: connecting one end (a left end in FIG. 5) of the conductive device 31 to a free end (a right end in the figure) of the first shielding layer 13, and connecting the other end (a right end in FIG. 5) of the conductive device 31 to a free end (a left end in the figure) of the second shielding layer 23.

The conductive device 31 and the first shielding layer 13 may be connected by welding such as laser welding, ultrasonic welding, resistance welding, pressure diffusion welding, or soldering, etc., so as to improve the connection strength between the conductive device 31 and the first shielding layer 13. Correspondingly, the conductive device 31 and the second shielding layer 23 may be connected by welding such as laser welding, ultrasonic welding, resistance welding, pressure diffusion welding, or soldering, etc., so as to improve the connection strength between the conductive device 31 and the second shielding layer 23.

It can be understood that during implementations, other ways may also be adopted to connect the conductive device 31 and the first shielding layer 13, and connect the conductive device 31 and the second shielding layer 23.

In addition, before step S31, the method may further include: disposing an isolation sleeve 30 at a periphery of a connection position between the first cable core 11 and the second cable core 21, so as to prevent undesirable conditions such as conductive contact between the connection position and the conductive device 31.

The isolation sleeve 30 may be a heat shrinkable tube, or any other insulation layers directly injection-molded at the periphery of the connection position.

In addition, in some embodiments, when a third protective layer 14 is disposed on an outer side of the first cable 10, step S11 further includes peeling of the third protective layer 14 of the first cable 10. Correspondingly, when a fourth protective layer 24 is disposed on an outer side of the second cable 20, step S21 further includes peeling off the fourth protective layer 24 of the second cable 20.

It can be understood that when manufacturing a cable assembly, the manufacturing sequence may be adjusted adaptively according to the actual situation, and some steps may be added or omitted, which is not limited in the present disclosure.

Obviously, various modifications and variations can be made to the present disclosure by those skilled in the art without departing from the spirit and scope of the present disclosure. Thus, if these modifications and variations to the present disclosure fall within the scope of the claims of the present disclosure and their technical equivalents, the present disclosure is intended to include these modifications and variations.

What is claimed is:

1. A cable assembly, comprising:
    a first cable which comprises a first cable core and a first shielding layer, wherein a periphery of the first cable core is wrapped by a first protective layer, and the first shielding layer is disposed on an outer side of the first protective layer; and
    a second cable which comprises a second cable core and a second shielding layer, wherein a periphery of the second cable core is wrapped by a second protective layer, and the second shielding layer is disposed on an outer side of the second protective layer,
    wherein a free end of the first cable core is connected to a free end of the second cable core, and a free end of the first shielding layer is connected to a free end of the second shielding layer,
    wherein the free end of the first shielding layer has an everted portion, and the free end of the second shielding layer has an everted portion, and
    wherein the first shielding layer and the second shielding layer are connected by butting an inner surface of the everted portion of the first shielding layer with an inner surface of the everted portion of the second shielding layer in a cross-sectional direction of the cable assembly.

2. The cable assembly according to claim 1, wherein a connection position between the first shielding layer and the second shielding layer is in a symmetrical connection arrangement or a 360° connection arrangement.

3. The cable assembly according to claim 1, wherein the free end of the first shielding layer is lapped or butted with the free end of the second shielding layer.

4. The cable assembly according to claim 1, wherein the first cable core has a protruding segment protruding out of the first protective layer, and the second cable core has a protruding segment protruding out of the second protective layer.

5. The cable assembly according to claim 4, further comprising an isolation sleeve disposed at peripheries of the protruding segments of the first cable core and the second cable core.

6. The cable assembly according to claim 5, wherein a thickness of the isolation sleeve is greater than at least one selected from the group consisting of a thickness of the first protective layer and a thickness of the second protective layer.

7. The cable assembly according to claim 5, wherein one end of the isolation sleeve is butted with the first protective layer, and the other end of the isolation sleeve is butted with the second protective layer.

8. The cable assembly according to claim 1, wherein the free end of the first cable core is lapped or butted with the free end of the second cable core, and wherein a minimum cross-sectional area of a lapped or butted position is greater than or equal to a smallest one of a cross-sectional area of the first cable core and a cross-sectional area of the second cable core.

9. The cable assembly according to claim 1, wherein a minimum cross-sectional area of a lapped or butted position between the free end of the first shielding layer and the free end of the second shielding layer is 60% to 260% of a smallest one of a cross-sectional area of the first shielding layer and a cross-sectional area of the second shielding layer.

10. The cable assembly according to claim 1, wherein the first cable further comprises a third protective layer and the second cable further comprises a fourth protective layer, wherein the third protective layer is disposed on an outer side of the first shielding layer, and wherein the fourth protective layer is disposed on an outer side of the second shielding layer.

11. A manufacturing method for a cable assembly, comprising:
    providing a first cable, which comprises a first cable core, a first protective layer and a first shielding layer, wherein the first protective layer is disposed on an outer side of the first cable core, the first shielding layer is disposed on an outer side of the first protective layer, and a free end of the first shielding layer has an everted portion;

peeling off the first shielding layer and the first protective layer at a first end of the first cable to expose the first cable core;

providing a second cable, which comprises a second cable core, a second protective layer and a second shielding layer, wherein the second protective layer is disposed on an outer side of the second cable core, the second shielding layer is disposed on an outer side of the second protective layer, and a free end of the second shielding layer has an everted portion;

peeling off the second shielding layer and the second protective layer at a first end of the second cable to expose the second cable core;

connecting a free end of the first cable core and a free end of the second cable core; and connecting the free end of the first shielding layer and the free end of the second shielding layer by:
  butting an inner surface of the everted portion of the free end of the first shielding layer with an inner surface of the everted portion of the free end of the second shielding layer in a cross-sectional direction of the cable assembly; or
  providing and disposing a conductive device at a part of a periphery of the first cable core and a part of a periphery of the second cable core, butting an inner surface of an everted portion of a first end of the conductive device with the inner surface of the everted portion of the free end of the first shielding layer in a cross-sectional direction of the cable assembly, and butting an inner surface of an everted portion of a second end of the conductive device with the inner surface of the everted portion of the free end of the second shielding layer in the cross-sectional direction.

12. The manufacturing method according to claim 11, wherein:
  the step of connecting the free end of the first cable core and the free end of the second cable core specifically comprises connecting the free end of the first cable core and the free end of the second cable core by welding or crimping; and
  the step of connecting the free end of the first shielding layer and the free end of the second shielding layer specifically comprises connecting the free end of the first shielding layer and the free end of the second shielding layer by welding.

13. The manufacturing method according to claim 11, wherein the step of connecting the free end of the first shielding layer and the free end of the second shielding layer specifically comprises:
  providing and disposing a conductive device at a part of a periphery of the first cable core and a part of a periphery of the second cable core, connecting a first end of the conductive device to a free end of the first shielding layer, and connecting a second end of the conductive device to a free end of the second shielding layer.

14. The manufacturing method according to claim 13, wherein before the step of connecting the first end of the conductive device to the free end of the first shielding layer, and connecting the second end of the conductive device to the free end of the second shielding layer, the method further comprises disposing an isolation sleeve at a periphery of a connection position between the first cable core and the second cable core.

15. A cable assembly, comprising:
  a first cable which comprises a first cable core and a first shielding layer, wherein a periphery of the first cable core is wrapped by a first protective layer, and the first shielding layer is disposed on an outer side of the first protective layer; and
  a second cable which comprises a second cable core and a second shielding layer, wherein a periphery of the second cable core is wrapped by a second protective layer, and the second shielding layer is disposed on an outer side of the second protective layer, wherein:
    a free end of the first cable core is connected to a free end of the second cable core, and a free end of the first shielding layer is connected to a free end of the second shielding layer;
    the cable assembly further comprises a conductive device disposed at a part of the periphery of the first cable core and a part of the periphery of the second cable core, a first end of the conductive device has an everted portion, and a second end of the conductive device has an everted portion;
    the free end of the first shielding layer has an everted portion, and the free end of the second shielding layer has an everted portion;
    the first shielding layer and the conductive device are connected by butting an inner surface of the everted portion of the first shielding layer with an inner surface of the everted portion of the first end of the conductive device in a cross-sectional direction of the cable assembly; and
    the second shielding layer and the conductive device are connected by butting an inner surface of the everted portion of the second shielding layer with an inner surface of the everted portion of the second end of the conductive device in the cross-sectional direction.

16. The cable assembly according to claim 15, wherein a connection position between the first end of the conductive device and the free end of the first shielding layer is in a symmetrical connection arrangement or a 360° connection arrangement, and a connection position between the second end of the conductive device and the free end of the second shielding layer is in a symmetrical connection arrangement or a 360° connection arrangement.

17. The cable assembly according to claim 15, wherein the conductive device is butted with the first shielding layer and with the second shielding layer.

18. The cable assembly according to claim 15, wherein an insulation protective layer is disposed at peripheries of the first shielding layer, the second shielding layer and the conductive device.

19. The cable assembly according to claim 15, wherein a minimum cross-sectional area of a butted position between the conductive device and the first shielding layer or the second shielding layer is 60% to 260% of a smallest one of a cross-sectional area of the first shielding layer and a cross-sectional area of the second shielding layer.

20. The cable assembly according to claim 15, wherein:
  an impedance of the connection position between the first shielding layer and the second shielding layer is less than 13.7 mΩ;
  an impedance of a connection position between the first end of the conductive device and the free end of the first shielding layer is less than 13.7 mΩ; and an impedance of a connection position between the second end of the conductive device and the free end of the second shielding layer is less than 13.7 mΩ.

21. The cable assembly according to claim 1, wherein the free end of the first cable core is lapped with the free end of the second cable core to form an overlapping surface, a first space is defined between the first cable core and an end face of the free end of the second cable core, a second space is defined between the second cable core and an end face of the free end of the first cable core, and the overlapping surface is located between the first space and the second space.

22. The cable assembly according to claim 1, wherein:
the free end of the first cable core has a thickness in the cross-sectional direction that is less than a diameter of a main body of the first cable core, and the free end of the second cable core has a thickness in the cross-sectional direction that is less than a diameter of a main body of the second cable core; and
the free end of the first cable core is lapped with the free end of the second cable core, the free end of the first cable core is spaced apart from the main body of the second cable core, and the free end of the second cable core is spaced apart from the main body of the first cable core.

\* \* \* \* \*